US012596846B2

(12) United States Patent
Tsuji et al.

(10) Patent No.: US 12,596,846 B2
(45) Date of Patent: Apr. 7, 2026

(54) INFORMATION PROCESSING DEVICE, INFORMATION PROCESSING METHOD, AND PROGRAM

(71) Applicant: PREMO INC., Tokyo (JP)

(72) Inventors: Hidenori Tsuji, Chuo-ku (JP); Junta Miyamoto, Chuo-ku (JP)

(73) Assignee: PREMO INC., Tokyo (JP)

( * ) Notice: Subject to any disclaimer, the term of this patent is extended or adjusted under 35 U.S.C. 154(b) by 445 days.

(21) Appl. No.: 18/183,081

(22) Filed: Mar. 13, 2023

(65) Prior Publication Data

US 2023/0283464 A1     Sep. 7, 2023

(30) Foreign Application Priority Data

Jan. 13, 2022    (JP) ................................. 2022-003974

(51) Int. Cl.
*G06F 21/64*          (2013.01)
(52) U.S. Cl.
CPC .................................... *G06F 21/64* (2013.01)
(58) Field of Classification Search
CPC .................................... G06F 21/64; H04L 9/32
See application file for complete search history.

(56) References Cited

U.S. PATENT DOCUMENTS

| | | | | |
|---|---|---|---|---|
| 2021/0326256 A1* | 10/2021 | Ogawa | ................ | G06F 11/1441 |
| 2021/0336775 A1* | 10/2021 | Gu | ......................... | G06Q 10/08 |
| 2024/0094266 A1* | 3/2024 | Tsuji | .................... | G01R 19/145 |

FOREIGN PATENT DOCUMENTS

| | | | | |
|---|---|---|---|---|
| JP | 2014-76527 A | 5/2014 | | |
| JP | 2019-122041 A | 7/2019 | | |
| JP | 2021-57740 A | 4/2021 | | |
| WO | WO-2021060564 A1 * | 4/2021 | ............. | G06Q 50/10 |

* cited by examiner

*Primary Examiner* — Jennifer Bahls

(57)          ABSTRACT

The data measured by the sensor can be stored in a way that is difficult to tamper with. An information processing device, comprising: a processor having a memory; a sensing unit; an acquisition unit for acquiring, using the sensing unit, a measurement value corresponding to the situation in which the information processing device is located; a calculation unit for calculating a situation value indicating a state pertaining to the situation based on the measured value; and a writing unit for issuing a write request to an external storage system via a communication network to write the situation value.

7 Claims, 4 Drawing Sheets

INFORMATION PROCESSING DEVICE, INFORMATION PROCESSING METHOD, AND PROGRAM

TECHNICAL FIELDS

This invention relates to information processing devices, information processing methods, and programs.

BACKGROUND ART

There is a known system in which data from sensor nodes is relayed by a gateway device (see Patent Literature 1).

PRIOR ART LITERATURE

Patent Literature

[PATENT LITERATURE 1] JP2021057740A

Summary of Invention

Technical Problem

In the system described in Patent Literature 1, the measurement data measured at sensor nodes is sent to the gateway and the data is analyzed in the cloud, so it is assumed that the analysis results processed in the cloud and the measurement data to be analyzed are eventually stored in the cloud, but the processing until the measurement data is stored is a problem. However, there is a possibility of data tampering during the process until the measurement data is stored.

The purpose of this invention is to provide a technology that can store data that is measured by a sensor that is difficult to tamper with.

Technical Solution

The main invention to solve the above problem is an information processing device, comprising: a processor having a memory; a sensing unit; an acquisition unit for acquiring, using the sensing unit, a measurement value corresponding to a situation in which the information processing device is located; a calculation unit for calculating a situation value indicating a state pertaining to the situation based on the measured value; and a writing unit for issuing a write request to an external storage system via a communication network to write the situation value.

Other issues disclosed in this application and their solutions will be clarified in the "DETAILED DESCRIPTION OF THE EMBODIMENTS" section and in the drawings.

Advantageous Effect

According to the present invention, data measured by sensors can be stored with difficulty in tampering.

DETAILED DESCRIPTION OF THE EMBODIMENTS

Summary of Invention

The following is a list and description of the contents of the embodiments of the invention. The invention comprises, for example, the following.

[Item 1]
An information processing device, comprising:
a processor having a memory;
a sensing unit;
an acquisition unit for acquiring, using the sensing unit, a measurement value corresponding to a situation in which the information processing device is located;
a calculation unit for calculating a situation value indicating a state pertaining to the situation based on the measured value; and
a writing unit for issuing a write request to an external storage system via a communication network to write the situation value.

[Item 2]
The information processing device of item 1,
wherein the processor and the sensing unit are mounted inseparably on a substrate.

[Item 3]
The information processing device as in item 1 or 2,
wherein the writing unit issues a transaction to write the situation value to a distributed ledger.

[Item 4]
The information processing device as in any one of items 1 to 3, further comprising:
a hash calculation unit for calculating a hash value based on the content of the situation value,
wherein the writing unit issues a write request to write said hash value together with the situation value storage unit to the storage system.

[Item 5]
The information processing device of any one of items 1 to 4, further comprising:
a secret key storage unit for storing a secret key; and
a digital signature unit for attaching a digital signature to the situation value using the secret key,
wherein the writing unit issues the write request to write the situation value with the electric signature attached to the storage system.

[Item 6]
An information processing method, wherein an information processing device comprising a processor having a memory and a sensing unit executes:
a step of acquiring, using the sensing unit, a measurement value corresponding to the situation in which the information processing device is located;
a step of calculating a situation value indicating a state pertaining to the situation based on the measured value; and
a step of issuing a write request to write the situation value to an external storage system via a communication network.

[Item 7]
A program for causing an information processing device comprising a processor with memory and a sensing unit to execute:

a step of acquiring measurement values corresponding to the situation in which the information processing device is located using the sensing unit;

a step of calculating a situation value indicating the state of the situation based on the acquired measurement values; and a step of issuing a write request for the situation value to an external storage system via a communication network.

[System Overview]

Figure 1:
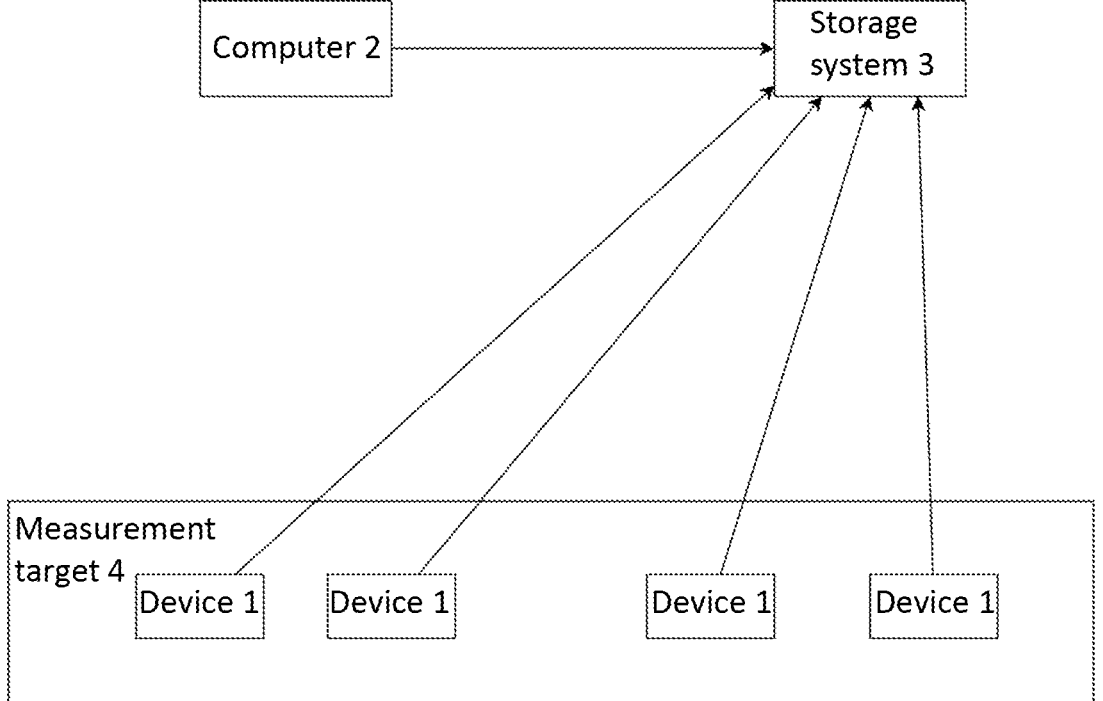
FIG. 1 shows an example of the overall configuration of an information processing system for one embodiment of this invention.

FIG. 1 shows an example of the overall configuration of an information processing system for one embodiment of this invention. The information processing system in this embodiment comprises a sensor device 1. The sensor device 1 is communicatively connected to a storage system 3 via a communication network. The communication network is, for example, the Internet, and is constructed by a public telephone line network, a cellular phone line network, a wireless communication channel, Ethernet (registered trademark), etc. The storage system 3 can also be communicatively connected to a computer 2 via the communication network.

The storage system 3 is a system capable of executing write requests via a communication network. In this embodiment, the storage system 3 is assumed to be, for example, a blockchain network comprised of multiple nodes that provides a distributed ledger. The storage system 3 can also be, for example, a relational database system. The storage system 3 can also be, for example, a network file system provided by a server computer. The storage system 3 can also be a storage service provided by cloud computing.

The sensor device 1 is a device that acquires values indicating the state pertaining to the situation in which sensor device 1 is located (hereinafter referred to as "situation values"). The sensor device 1 can be placed inside or on the surface of a measurement target 4 to acquire the state of the measurement target 4 (e.g., temperature, vibration, pressure, electromagnetic waves, volume of sound, humidity, etc.). The measurement target 4 may be, for example, an embankment or concrete, or it may be water or air. This embodiment of the sensor device 1 has a communication function and writes data directly to the storage system 3.

Computer 2 is a computer that accesses storage system 3 and uses the data stored in storage system 3. The so-called end user can use the computer 2 to analyze situation values acquired by the sensor device 1.

[Hardware]

Figure 2:
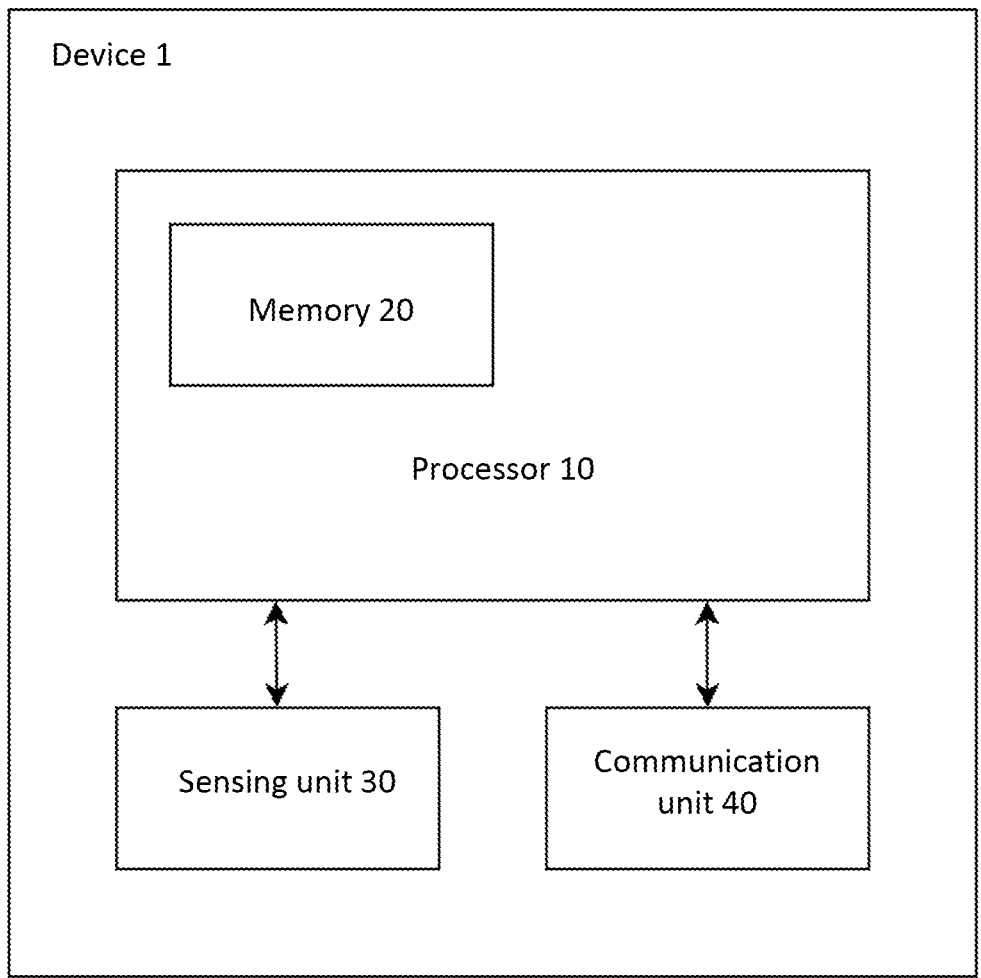
FIG. 2 shows an example of the hardware configuration of a sensor device, which is one embodiment of this invention.

FIG. 2 shows an example of the hardware configuration of a sensor device, which is one embodiment of this invention. The sensor device 1 has a processor 10 and a sensing unit 30, and the processor 10 has a memory 20. At least a portion of the memory 20 can contain programs to be executed by the processor 10, including nonvolatile storage devices.

The sensing unit 30 measures measured values according to the situation in which the sensor device is deployed.

The processor 10 can calculate situation values by receiving the measured values from the sensing unit 30, recording them in the memory 20, and feeding the measured values to the calculation logic. A situation value is values that indicate the state of the situation in which the sensor device is deployed, such as temperature, vibration, pressure, electromagnetic waves, volume of sound, and humidity, etc. The processor 10 records the calculated situation values in memory 20.

In this embodiment, a coil 30 is applied as an example of a sensing unit, but it is not limited to this. The coil 30 can transmit and receive signals with the coils 30 of other sensor devices that are placed adjacent to it. In this embodiment, sensor devices are used in pairs. As the relative distance or relative angle between the coils of the two sensor devices changes, the communication strength changes and the voltage value or amplitude value of the voltage generated in the coils changes. In this embodiment, the processor 10 can calculate the situation value using this voltage as the measured value based on the calculation logic. The memory 20 can temporarily record the calculated situation value.

Communication unit 40 can communicate with external devices. The communication unit 40 can be realized, for example, by a coil 30. The same coil can be used for the sensing unit 30 and the communication unit 40 to realize their respective functions.

The processor 10 and sensing unit 20 (and communication unit 40) can be mounted on a semiconductor chip (on one chip) inseparably. In such a case, the diameter of the sensor device 1 can be about 0.3 mm. Here, a semiconductor chip is defined as a small thin piece of silicon (silicon die or die) in which electronic circuits are incorporated. Alternatively, in some cases, it can be defined as a package in which the silicon die is encapsulated.

The sensor device of this embodiment stores calculation logic for each of the multiple types of situation values and can calculate multiple types of situation values from the same measured value. By using the calculation logic corresponding to a specified type, the sensor device can obtain different types of situation values based on the same sensor measurement (voltage measured by the coil 30). For example, based on the voltage value (measured value) measured by the coil, the first calculation logic can calculate temperature as a situation value and the second calculation logic can calculate vibration as a situation value.

[Software]

Figure 3:
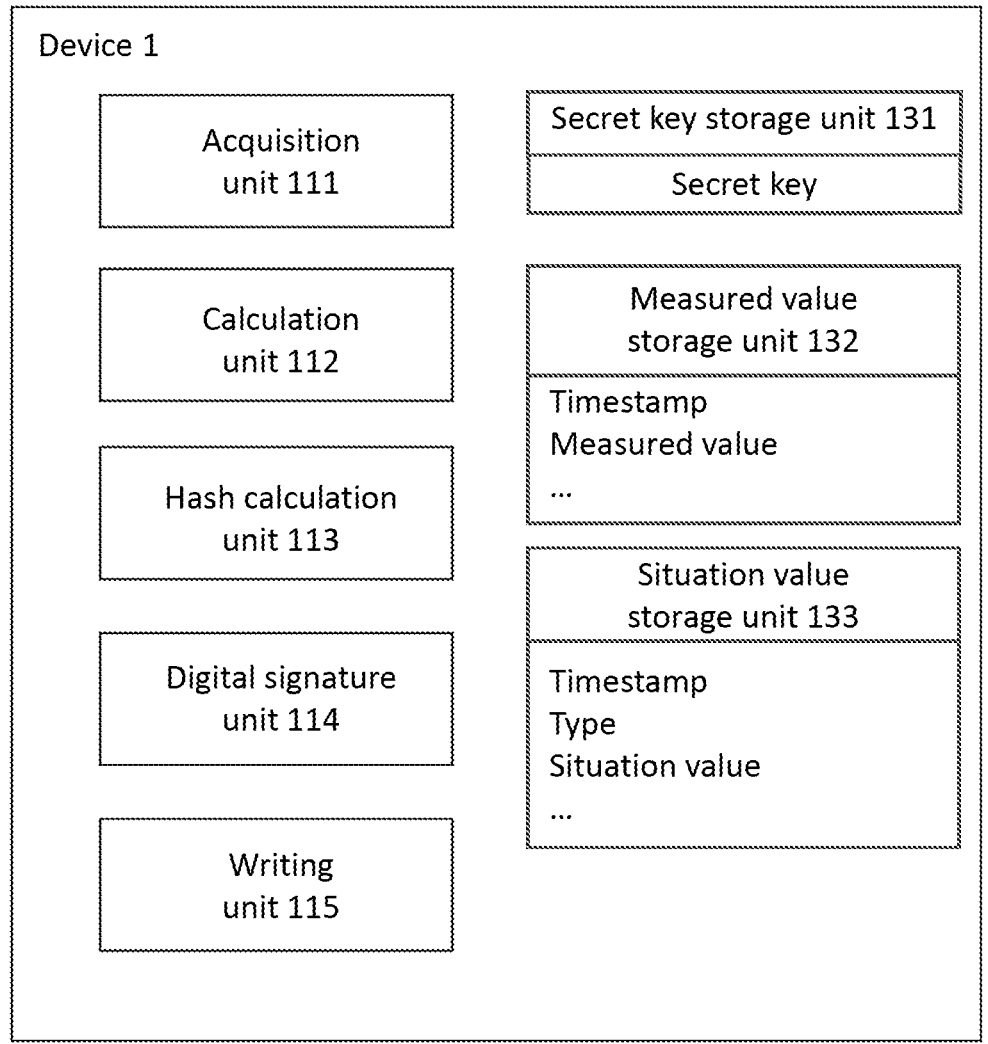
FIG. 3 shows a block diagram showing the functional configuration of the sensor device 1.

FIG. 3 is a block diagram showing the functional configuration of sensor device 1. The sensor device 1 is comprised of an acquisition unit 111, a calculation unit 112, a hash calculation unit 113, a digital signature unit 114, a writing unit 115, a secret key storage unit 131, a measurement value storage unit 132, and a situation value storage unit 133.

The acquisition unit 111, the calculation unit 112, the hash calculation unit 113, the digital signature unit 114, and the writing unit 115 can be realized by the processor 10 executing a program stored in the memory 20. The secret key memory unit 131, the measurement value memory unit 132, and the situation value memory unit 133 can be realized by the memory 20.

The secret key storage unit 131 stores a secret key. The secret key may be pre-set at the time of device manufacture, or it may be set as appropriate after device manufacture and before the device is used. Furthermore, it is also possible to change the setting of the secret key as appropriate during operation of the system using the device. For example, the sensor device 1 may be equipped with a key generation unit that generates pairs of private and public keys and a public key storage unit that stores the public key. The key generation unit can generate a private and public key pair and register the private key in the private key storage unit 131 and the public key in the public key storage unit. The key generation unit can as well output the public key in response to an external request.

Measured value storage unit 132 stores information including measured values (hereinafter referred to as "measured value information"). The measured value information includes a time stamp and a measured value. The time stamp can be the point in time when the sensing unit 30 measures the measured value, when the processor 10 acquires the measured value from the sensing unit 30, or when the measured value information is registered in the measured value storage unit 132.

The situation value storage unit 133 stores information including situation values (hereinafter referred to as "situation value information"). The situation value storage unit 133 of this embodiment is capable of storing the history of situation values by type. The situation value information can include a time stamp, type (temperature, vibration, pressure, electromagnetic waves, volume of sound, humidity, etc.), and situation value. The time stamp can be, for example, the point in time when the processor 10 calculated the situation values based on the measurements or when the situation value information was registered in the situation value memory unit 133.

The acquisition unit 111 uses the sensing unit 30 to acquire a measurement value (a value corresponding to the measurement target 4) according to the situation in which the sensor device 1 is placed. The acquisition unit 111 in this embodiment can acquire the value of the voltage generated in the coil 30 as a measurement value. The acquisition unit 111 can create measurement value information including the measurement value acquired from the sensing unit 30 and register it in the measurement value storage unit 132.

The calculation unit 112 calculates situation values based on measured values. The calculation unit 112 can calculate the situation value from the measured values using the calculation logic corresponding to the set type. The calculation logic may be stored in the memory 20 for each type in advance, for example. The types of situation values to be calculated may also be stored in memory 20 in advance. The calculation unit 112 can calculate the situation value by feeding the measurement value acquired by the acquisition unit 111 to the calculation logic corresponding to the set type. The calculation unit 112 can create situation value information including the calculated situation value and register it in the situation value storage unit 133. The calculation unit 112 can calculate the situation value by giving the calculation logic a history of the measured values recorded in the measured value storage unit 132 instead of or in addition to the measured values acquired by the acquisition unit 111.

The hash calculation unit 113 calculates a hash value based on the contents of the situation value. The hash calculation unit 113 can calculate the hash value using any hash function, such as SHA-256, SHA-512, or MD5, for example.

The digital signature unit 114 attaches a digital signature to the situation value. The digital signature unit 114 can generate a digital signature, for example, by encrypting a hash value calculated by the hash value calculation unit 113 using the private key stored in the private key storage unit 131. The digital signature unit 114 can also identify the processor that generated the situation values by, for example, registering unique identification information for each processor in the initial configuration of the processor or by attaching such identification information to the situation values using the identification information assigned at the time of manufacture of the processor.

The writing unit 115 issues a write request (command) to an external storage system 3 over a communication network requesting that a situation value memory unit be written. The writing unit 115 can, for example, issue a WRITE command to an external storage device.

The writing unit 115 can issue a write request to attach the digital signature created by the digital signature unit 114 to the situation value storage unit 3. For example, the writing unit 115 can issue a transaction to write the situation value to the distributed ledger managed by the blockchain.

The writing unit 115 may also issue a write request to write the hash value calculated by the hash calculation unit 113 to the storage system 3, along with the situation value storage unit.

[Operation]

Figure 4:
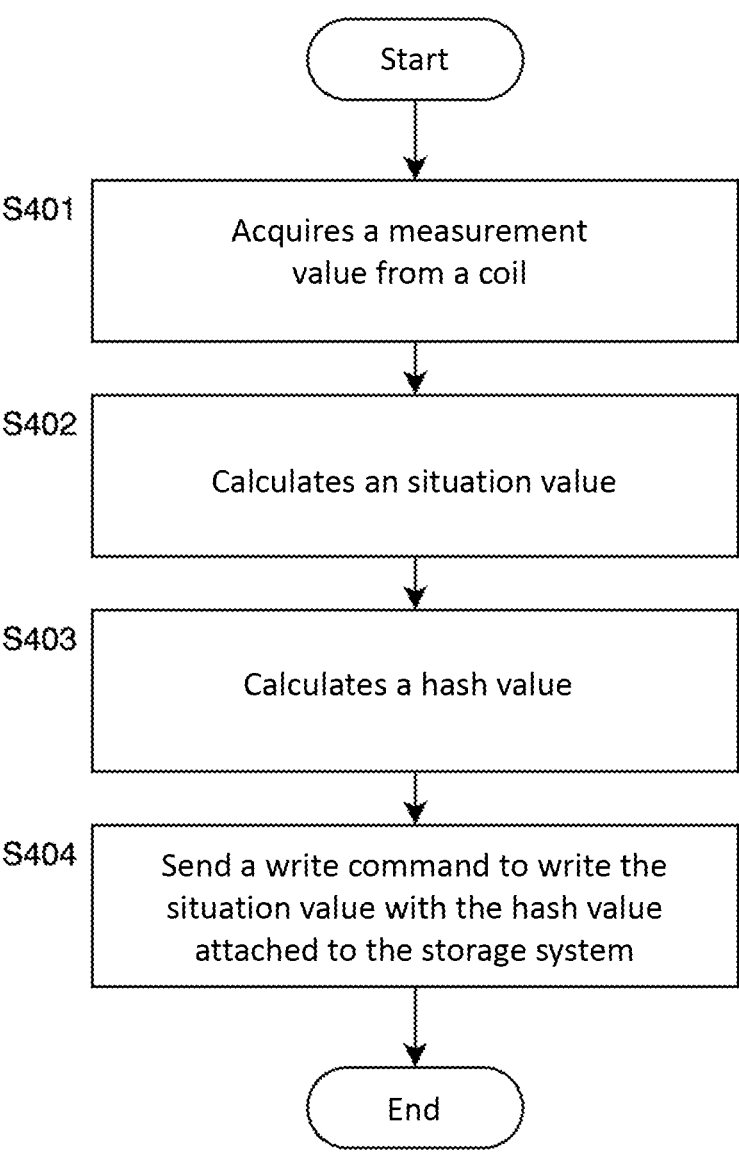
FIG. 4 shows a diagram, which illustrates the operation of this embodiment of the information processing system.

FIG. 4 illustrates the operation of this embodiment of the information processing system.

The sensor device 1 acquires the measurement values by sensing unit 30 (coil) (S401) and calculates the situation values by applying the predetermined calculation logic to the acquired measured values (S402). The sensor device 1 calculates a hash value of the situation value (S403) and sends a write request to storage system 3 to write the situation value with the hash value attached to storage system 3 (S404).

In the information processing system of this embodiment described above, the sensor device 1 placed inside the measurement target 4 can calculate situation values that indicate the state of the measurement target 4 and write the situation values directly to the storage system 3. Therefore, the possibility that the situation values are taken from the sensor device 1, tampered with, and then registered in the storage system 3 can be eliminated, and the integrity of the data can be assured.

This embodiment is described above to facilitate understanding of the invention and is not intended to limit the interpretation of the invention. The invention may be changed and improved without departing from its intent, and the invention also includes equivalents thereof.

DESCRIPTION OF REFERENCE NUMERALS

1 Sensor Device
2 Computer
3 Storage System
4 Measurement target
10 Processor
20 Memory
30 Sensing unit
40 Communication unit

The invention claimed is:

1. An information processing device, comprising:
a processor having a memory;
a sensing unit comprising a coil, the coil configured to:
  produce a signal corresponding to a measured value corresponding to a physical phenomenon of a situation in which the information processing device is located, and
  serve as a transmission and reception element;
an acquisition unit that acquires, using the sensing unit, the measured value corresponding to the physical phenomenon of the situation in which the information processing device is located;
a calculation unit that calculates a situation value indicating a state pertaining to the situation based on the measured value;
a communication unit that communicates with an external storage system by transmitting and receiving signals through the coil of the sensing unit; and
a writing unit that issues a write request to write the situation value to the external storage system via the communication unit.
2. The information processing device according to claim 1, wherein the processor and the sensing unit are mounted inseparably on a single chip.

3. The information processing device according to claim 1, wherein the writing unit issues a transaction to write the situation value to a distributed ledger.

4. The information processing device according to claim 1, further comprising:

a hash calculation unit that calculates a hash value based on the content of the situation value, wherein the writing unit issues a write request to write the hash value together with the situation value to the storage system.

5. The information processing device according to claim 1, further comprising:

a secret key storage unit that stores a secret key; and a digital signature unit that attaches a digital signature to the situation value using the secret key, wherein the writing unit issues the write request to write the situation value with the electric signature attached to the storage system.

6. An information processing method executed by an information processing device comprising a processor having a memory, a sensing unit comprising a coil and configured to produce, using the coil, a signal corresponding to a measured value corresponding to a physical phenomenon of a situation in which the information processing device is located, and a communication unit that communicates with an external storage system via the coil of the sensing unit, the method comprising:

acquiring, using the sensing unit, the measured value corresponding to the physical phenomenon of the situation in which the information processing device is located;

calculating a situation value indicating a state pertaining to the situation based on the measured value; and issuing a write request to write the situation value to the external storage system via the communication unit.

7. A non-transitory computer-readable medium storing a program for causing an information processing device comprising a processor with memory, a sensing unit comprising a coil and configured produce, using the coil, a signal corresponding to a measured value corresponding to a physical phenomenon of a situation in which the information processing device is located, and a communication unit that communicates with an external storage system via the coil of the sensing unit, to execute processing comprising:

acquiring measured value corresponding to a situation in which the information processing device is located using the sensing unit;

calculating a situation value indicating the state of the situation based on the acquired measurement value; and issuing a write request to write the situation value to the external storage system via the communication unit.

\* \* \* \* \*